(12) United States Patent
Yamanakajima

(10) Patent No.: US 8,441,676 B2
(45) Date of Patent: May 14, 2013

(54) INFORMATION PROCESSING APPARATUS FOR REMOVING BLANK PORTIONS FROM A DOCUMENT AND TAKING PRINT SETTING INTO CONSIDERATION

(75) Inventor: Kazunari Yamanakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 12/891,613

(22) Filed: Sep. 27, 2010

(65) Prior Publication Data

US 2011/0075211 A1 Mar. 31, 2011

(30) Foreign Application Priority Data

Sep. 29, 2009 (JP) ................................ 2009-224826

(51) Int. Cl.
*G06K 15/00* (2006.01)
*G06F 17/24* (2006.01)

(52) U.S. Cl.
USPC ......... 358/1.18; 358/528; 358/1.12; 358/450; 715/243

(58) Field of Classification Search ........ 358/1.13–1.18, 358/450, 540, 528, 1.12; 715/243–253
See application file for complete search history.

(56) References Cited

U.S. PATENT DOCUMENTS

| | | | | |
|---|---|---|---|---|
| 4,723,211 A | * | 2/1988 | Barker et al. | 715/210 |
| 5,357,348 A | * | 10/1994 | Moro | 358/450 |
| 5,642,473 A | * | 6/1997 | Klotz, Jr. | 358/1.18 |
| 7,356,760 B2 | * | 4/2008 | Jaeger | 715/246 |
| 7,599,094 B2 | * | 10/2009 | Sellers et al. | 358/2.1 |
| 7,692,834 B2 | * | 4/2010 | Matsuzaki | 358/528 |
| 2004/0109201 A1 | * | 6/2004 | Teraue | 358/1.18 |

FOREIGN PATENT DOCUMENTS

| | | |
|---|---|---|
| JP | 2000-318230 A | 11/2000 |
| JP | 2003-054065 A | 2/2003 |

* cited by examiner

*Primary Examiner* — Dennis Dicker
(74) *Attorney, Agent, or Firm* — Canon USA Inc. IP Division

(57) ABSTRACT

In a case where both a first group and a second group obtainable by dividing a head rendering object of a second page can be disposed on a same surface of a same paper, the head rendering object of the second page is divided into the first group and the second group and the first group is located on the first page.

3 Claims, 19 Drawing Sheets

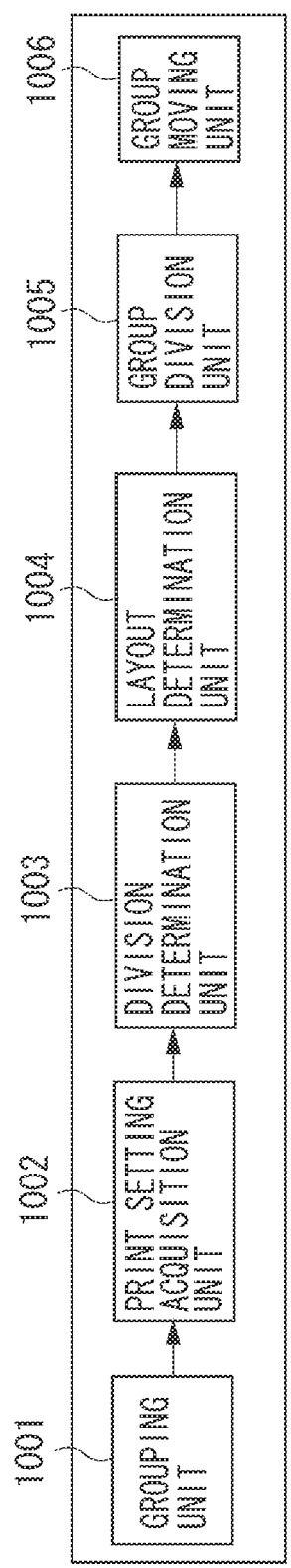

FIG. 8
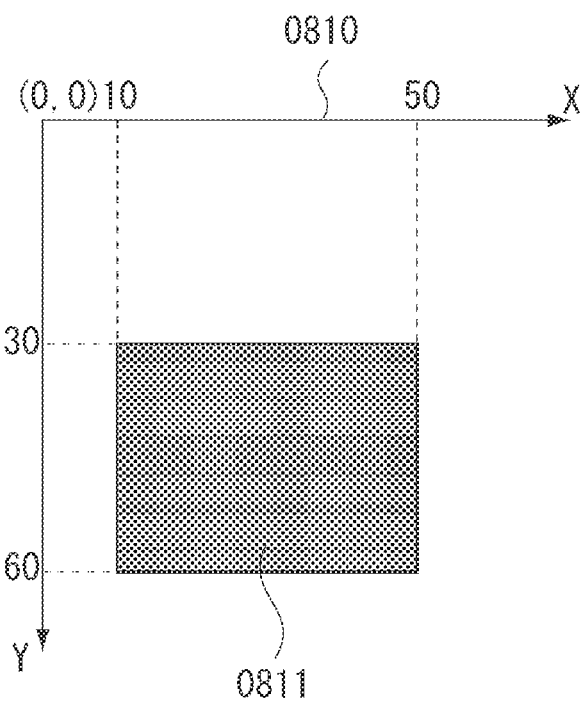
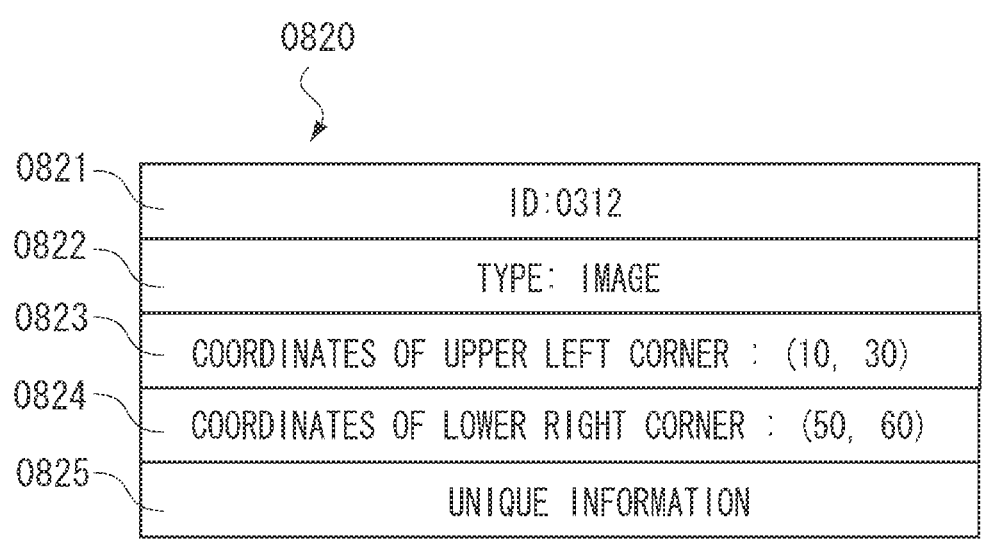

FIG. 11

```
         .
         .
<LayoutPreparationParams NumberUp="2 1">
         .
         .
```

INFORMATION PROCESSING APPARATUS FOR REMOVING BLANK PORTIONS FROM A DOCUMENT AND TAKING PRINT SETTING INTO CONSIDERATION

BACKGROUND OF THE INVENTION

1. Field of the Invention

The present invention relates to an information processing apparatus, a method for controlling the information processing apparatus, and a storage medium storing a program that causes a computer to control the information processing apparatus.

2. Description of the Related Art

As discussed in Japanese Patent Application Laid-Open No. 2000-318230, to increase the print efficiency of papers in a printing of an electronic document, a conventional technique is capable of removing blank portions from the document and, as a result, reducing the number of papers to be output. In the following description of the present invention, the technique capable of removing blank portions from a document and reducing the number of papers to be output is referred to as "print saving."

Further, an electronic document may include graphic patterns and tables. As discussed in Japanese Patent Application Laid-Open No. 2003-54065, a conventional technique is capable of grouping rendering objects (e.g., character strings, graphic patterns, and images) of an electronic document considering the layout or ease of reading an output document and editing each group.

In this case, the "grouping" can be referred to as a process for uniting a plurality of rendering objects as a group. On the other hand, N-in-1 printing can be generally used to allocate a plurality of pages on a same surface of a paper. The N-in-1 printing is an effective technique capable of increasing the print efficiency of papers.

However, the print saving performed according to the conventional technique does not take print setting into consideration. Therefore, even when a space available to locate a rendering object of the second page to the first page is generated by deleting a blank portion of the first page, the rendering object of the second page may not be entirely accommodated in the generated space of the first page.

In such a case, the conventional technique does not perform the print saving processing because the rendering object of the second page cannot be entirely accommodated in the generated space of the first page. Therefore, the rendering object of the second page cannot be moved to the first page.

SUMMARY OF THE INVENTION

Exemplary embodiments of the present invention are directed to a technique capable of taking print setting into consideration so as to increase the execution frequency of print saving processing.

According to an aspect of the present invention, an information processing apparatus includes an acquisition unit configured to acquire print setting information; a determination unit configured to determine whether, in a case where a head rendering object of a second page of a document cannot be disposed on a first page that precedes the second page, a first group and a second group obtainable by dividing the head rendering object of the second page can be located on a same surface of a same paper based on the print setting information acquired by the acquisition unit; and a layout unit configured to execute locating processing for locating the first group on the first page if the determination unit determines that both the first group and the second group can be disposed on the same surface of the same paper.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a functional block diagram relating to a print saving function.

FIG. 8 illustrates an example of attribute information of a rendering object.

FIG. 11 illustrates an example print setting, which is described in the first example embodiment of the present invention.

DESCRIPTION OF THE EMBODIMENTS

Various exemplary embodiments, features, and aspects of the invention will be described in detail below with reference to the drawings.

In the following description, the 2-in-1 printing is one of print settings that regulate allocation of pages. The 2-in-1 printing is for allocating two pages to be output on the same surface of a paper. In general, print setting for allocating a plurality of pages (N pages) on the same surface is referred to as "N-in-1" printing.

First, a schematic configuration of the present invention is described below with reference to FIGS. 1 and 2. A module configuration illustrated in FIG. 1 includes a grouping unit 1001, a print setting acquisition unit 1002, a division determination unit 1003, a layout determination unit 1004, a group division unit 1005, and a group moving unit 1006, which can cooperatively perform print saving processing according to an exemplary embodiment of the present invention.

Figure 2A:
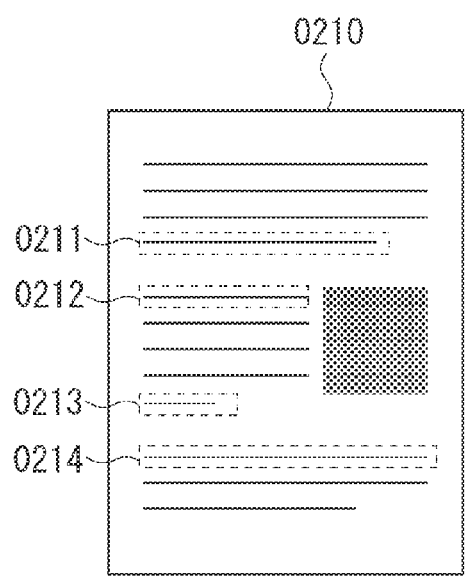
FIGS. 2A and 2B are schematic views relating to example grouping.
Figure 2B:
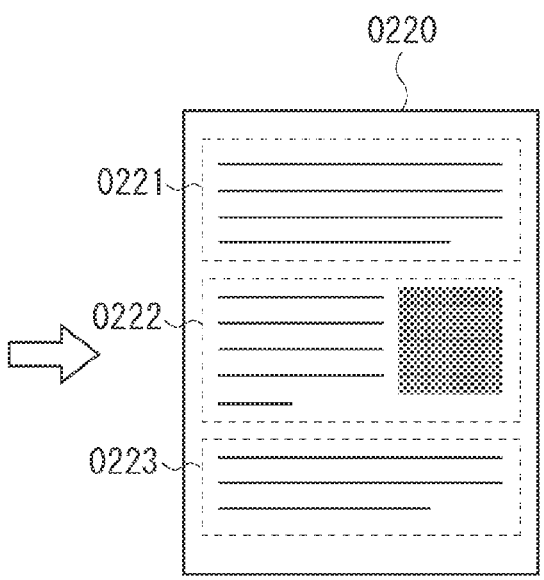

The grouping unit 1001 can perform grouping of a plurality of objects (rendering objects) included in an electronic document illustrated in FIG. 2A into a plurality of blocks that constitute a document as illustrated in FIG. 2B. Each of the blocks illustrated in FIG. 2B is a united block that is easy to view or integrated according to content. FIG. 2A illustrates an arbitrary page 0210 included in the electronic document. The page 0210 includes a plurality of text objects 0211 to 0214, each being a one-line text.

The grouping unit 1001 can generate a page 0220 from the page 0210 by grouping the rendering objects in the page 0210. The grouping unit 1001 generates groups 0221 to 0223 based on the distance between the rendering objects or the size of a blank portion. The grouping unit 1001 reads coordinates of a lower-right corner (attribute information) of the text object 0211 and coordinates of an upper-left corner (attribute information) of the text object 0212, and recognizes that no rendering object is present between the text objects 0211 and 0212. Similarly, the grouping unit 1001 performs similar processing for the text object 0213 and the text object 0214.

The grouping unit 1001 identifies an area where no object is present as a blank area and recognizes an area extending from the top of the page to the text object 0211 as one group 0221. Similarly, the grouping unit 1001 generates groups 0222 and 0223. Each group can be identified as a target to be moved when the print saving processing is performed. After the grouping of rendering objects by the grouping unit 1001 is completed, group information is written into a memory.

For example, the group information includes page information indicating a page in which a group is present, information indicating coordinate values defining a rectangular shape of the group, and reference information indicating each rendering object included in the group. The various written information can be used when group division or group moving processing is performed.

The method for identifying the grouping is, for example, a method using a line feed code, a method using a blank area equal to or greater than a predetermined value, or can be any other methods.

The print setting acquisition unit 1002, for example, acquires print setting information, such as 2-in-1 printing, two-sided printing, saddle stitch binding printing, and case binding printing.

The division determination unit 1003 determines whether division of the groups being generated through the above-described grouping processing can be performed, based on the print setting information acquired by the print setting acquisition unit 1002.

The layout determination unit 1004 determines whether the group of a page having been generated by the grouping unit 1001 can be disposed on another page that is a moving destination of the group. The group moving unit 1006 moves a part of division groups divided by the group division unit 1005 to another page.

Example print saving processing that can be performed for each generated group is described below with reference to FIG. 3. An electronic document illustrated in FIG. 3 includes continuous pages 0310 and 0320. The page 0320 is referred to as a second page because a moving target group is present on the page 0320. The page 0310 is referred to as a first page because the page 0310 is a moving destination of the moving target group. The first page corresponds to a page preceding the second page.

The first page includes a blank area 0311. Further, the first page includes a rendering object group 0312. The rendering object group 0312 includes a text object 0313 positioned at the lower end thereof.

The second page 0320 includes three groups 0321 to 0323. Arrow lines 0331 and 0332 indicate an upper side position and a lower side position in a case where the group 0321 is moved to the blank area 0311.

If it is determined that the group 0321 can be located in the blank area 0311, the group moving unit 1006 moves the group 0321 to the first page.

Figure 3:
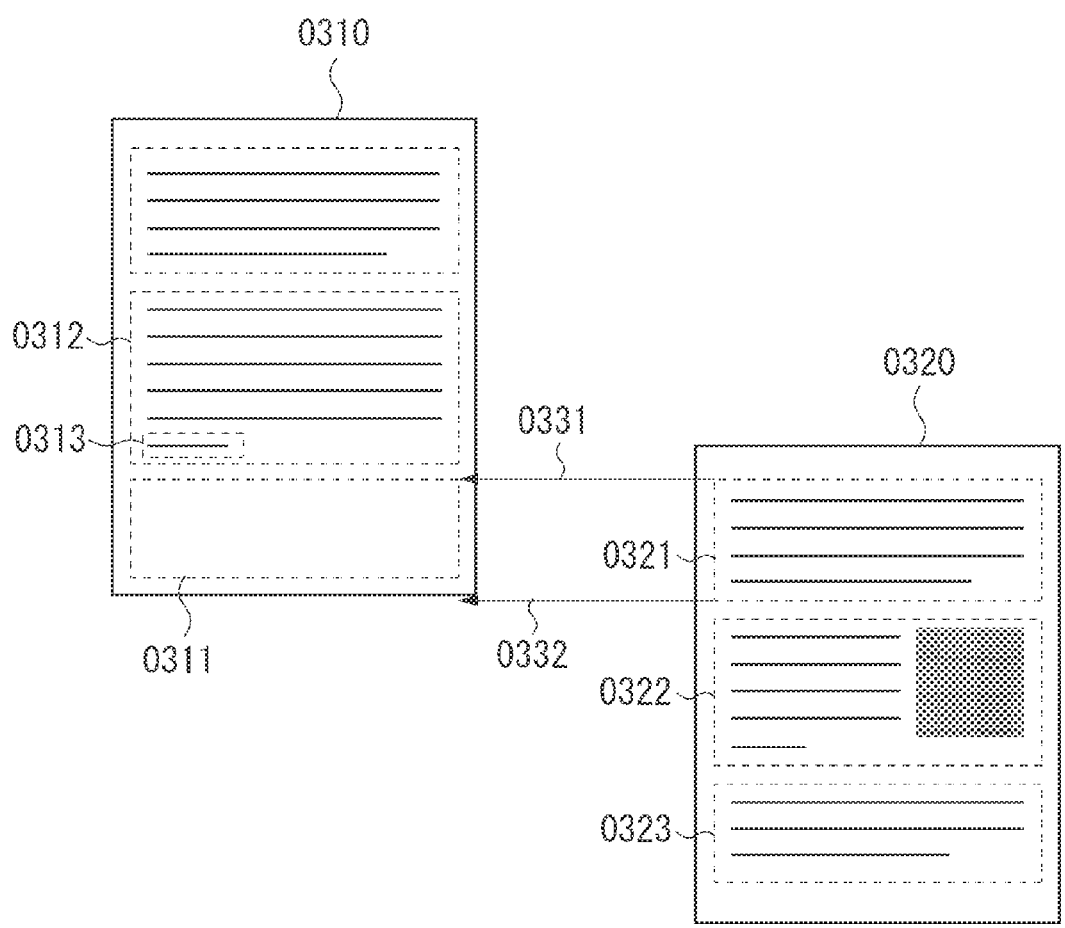
FIG. 3 is a schematic view relating to print saving processing.

However, according to the example illustrated in FIG. 3, as indicated by the arrow 0332, the group 0321 cannot be entirely accommodated in the blank area 0311. Therefore, it is concluded that relocation of the group 0321 is infeasible.

Therefore, to solve the problem illustrated in FIG. 3, the print saving processing according to the present exemplary embodiment further includes performing group division processing for dividing the group 0321 into a plurality of groups.

The print saving processing including the group division processing is described below with reference to FIGS. 4 and 5.

Figure 4:
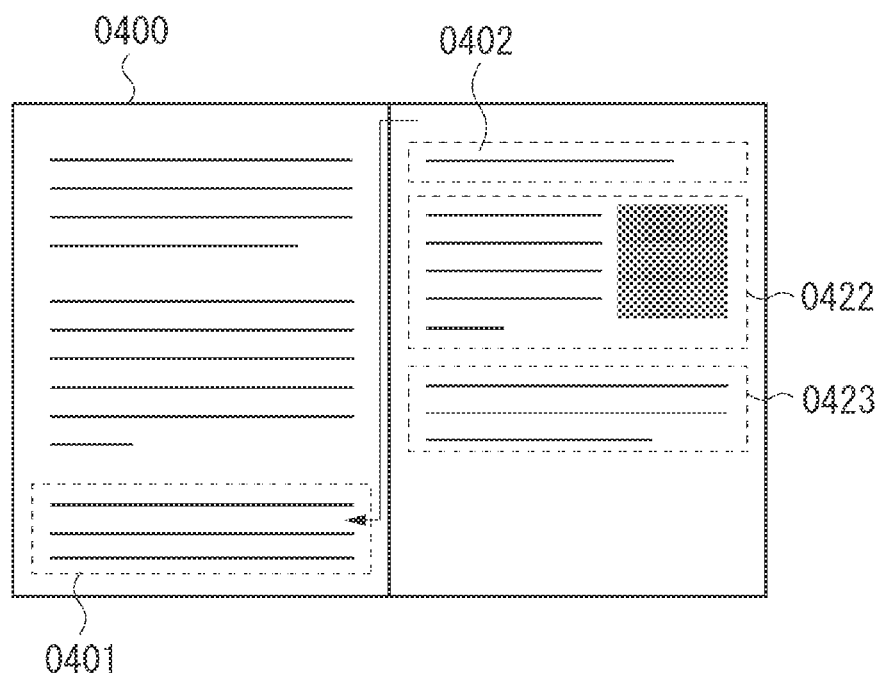
FIG. 4 is a schematic view illustrating group division and print saving processing.

FIG. 4 is a schematic view illustrating division of groups resulting in the print saving processing. A document image illustrated in FIG. 4 is obtainable by applying the group division processing to the electronic document illustrated in FIG. 3. A document image of a paper surface 0400 can be formed when 2-in-1 printing is performed to output the first page 0310 and the second page 0320 of the electronic document illustrated in FIG. 3.

One group 0401 and another group 0402 are division groups (i.e., a first group and a second group) that can be obtained by dividing the group 0321 illustrated in FIG. 3 into two. When the division group 0401 (i.e., the first group) moves to the first page, the remaining groups 0422 and 0423 move upward on the same page (i.e., the second page).

Namely, the layout of FIG. 4 includes a newly generated blank area that is obtainable by dividing one group 0321 illustrated in FIG. 3 into two groups 0401 and 0402 (see FIG. 4). For example, a rendering object of the third page can be moved into the generated blank area. As a result, the number of required papers may be reduced from two to one.

The group division illustrated in FIG. 4 is further described below in more detail with reference to an example group division illustrated in FIG. 5.

Figure 5:
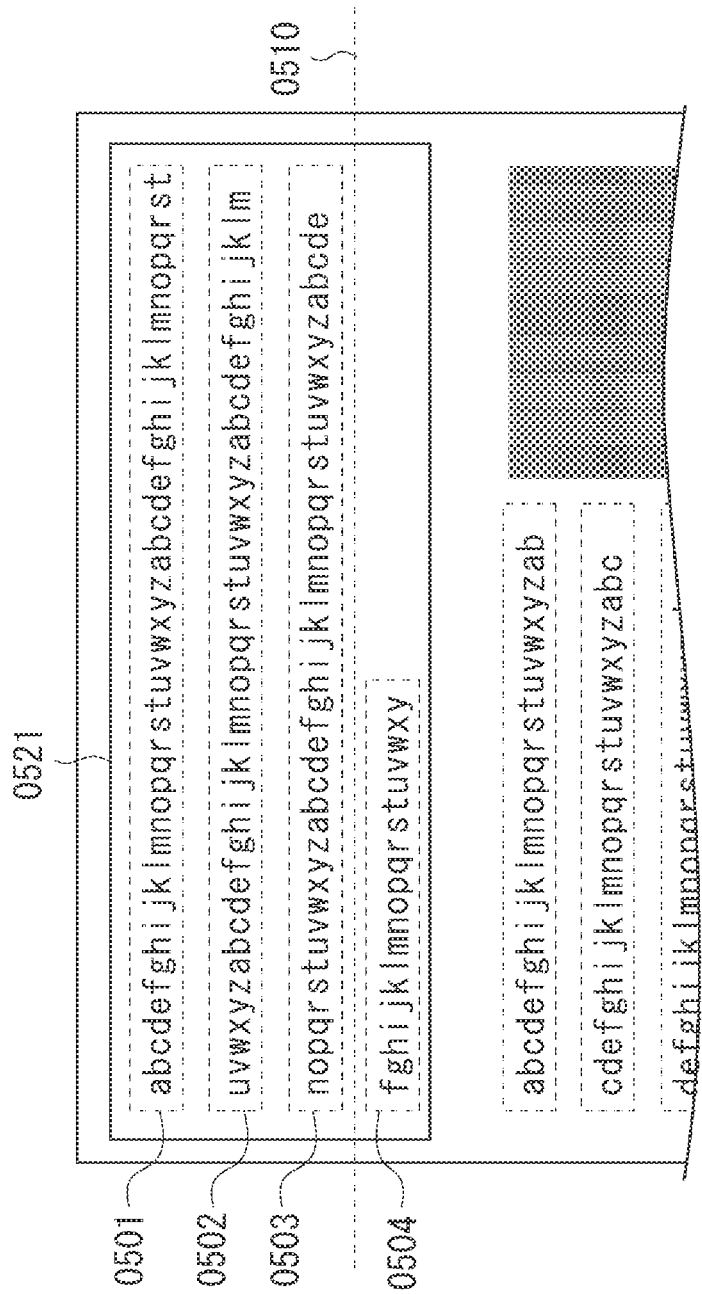
FIG. 5 illustrates example group division.

FIG. 5 includes four text objects 0501 to 0504 included in the non-divided group 0321 illustrated in FIG. 3. A group 0521 illustrated in FIG. 5 is the group 0321 illustrated in FIG. 3.

First, the processing according to the present exemplary embodiment includes calculating a vertical width of the blank area 0311 illustrated in FIG. 3 based on page information and coordinates of the lower-right corner (attribute information) of the text object 0313 (FIG. 3) that is positioned immediately before the blank area.

Similarly, the processing according to the present exemplary embodiment includes calculating vertical widths of respective text objects 0501 to 0504 based on coordinates of an upper-left corner and coordinates of a lower-right corner included in respective attribute information.

The processing according to the present exemplary embodiment includes identifying a text object that can be disposed in the blank area 0311 (see FIG. 3) considering the calculated size of the blank area 0311 (see FIG. 3) and then performing grouping based on the identified text object.

It is now assumed that the vertical width of the blank area 0311 (FIG. 3) is 10 and the vertical width of respective rendering objects 0501 to 0504 is 3.

In this case, the vertical width (=10) of the blank area 0311 is greater than the total width (=9) of three rendering objects 0501 to 0503. However, if the rendering object 0504 is added to the rendering objects 0501 to 0503, the blank area 0311 becomes smaller in vertical width than the sum of four rendering objects 0501 to 0504. Therefore, the processing according to the present exemplary embodiment includes generating one group composed of three text objects 0501 to 0503. A dotted line 0510 indicates a boundary line of the generated group composed of three text objects 0501 to 0503.

Further, the processing according to the present exemplary embodiment includes generating another group composed of the remaining rendering object 0504.

The processing according to the present exemplary embodiment includes moving the formerly generated group (0501 to 0503: hereinafter referred to as "first group") into the first page and locating the first group in the blank area of the first page. Further, the processing according to the present exemplary embodiment includes shifting the remaining group (0504: hereinafter referred to as "second group") upward by an amount corresponding to the vertical width of the first group.

Further, the processing according to the present exemplary embodiment includes storing, into the memory, page information and coordinate information of each divided group and reference information indicating each rendering object included in the group.

The above-described processing is print saving processing according to an exemplary embodiment of the present invention.

Figure 6:
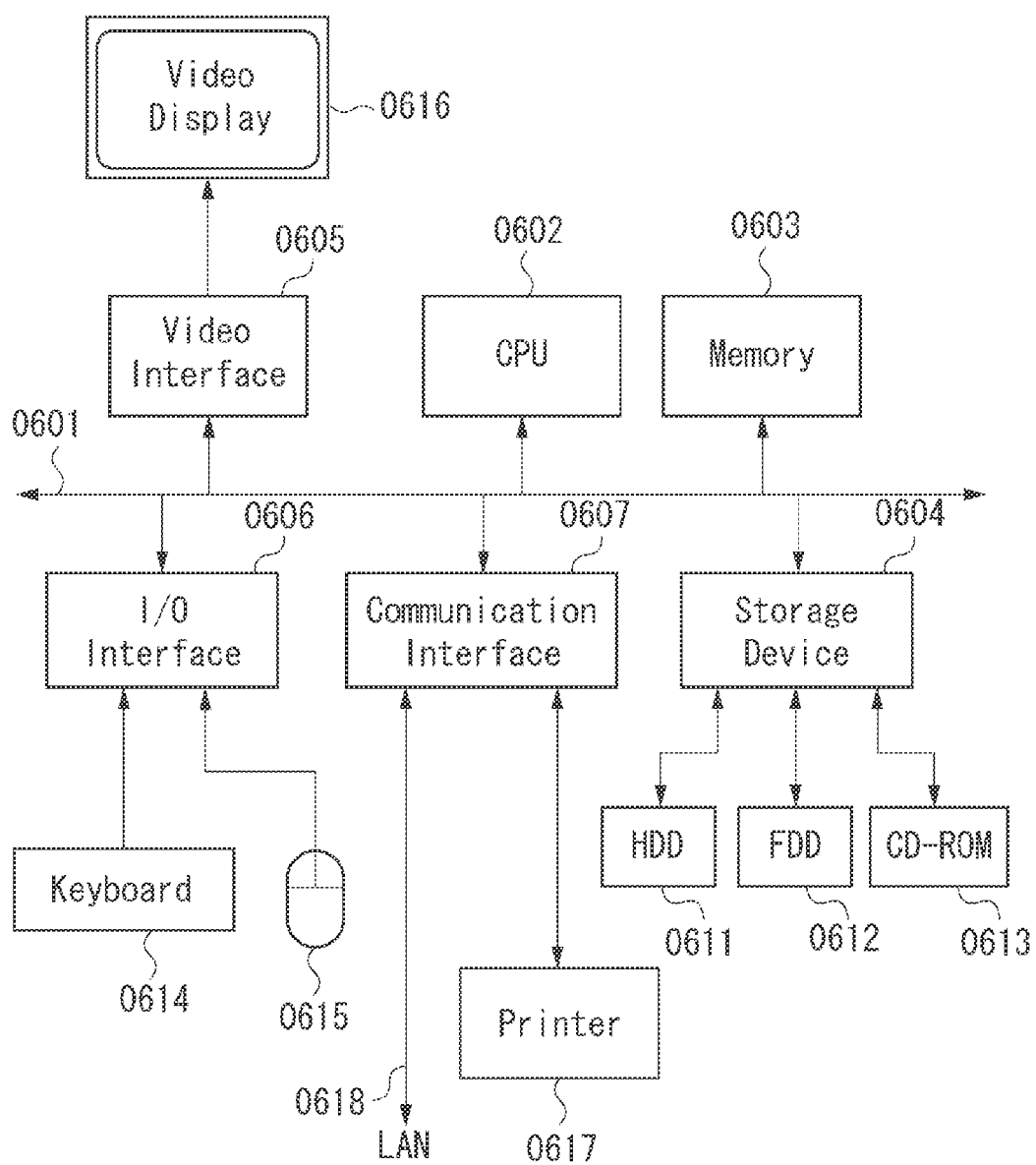
FIG. 6 is a block diagram illustrating an example configuration of an information processing apparatus according to an exemplary embodiment of the present invention.

FIG. 6 illustrates an information processing apparatus that can perform print saving processing according to an exemplary embodiment of the present invention. The information processing apparatus capable of performing the print saving processing is, for example, an information processing apparatus, such as a personal computer (hereinafter, referred to as "PC"), or a multi-function peripheral (hereinafter, referred to as "MFP").

The information processing apparatus illustrated in FIG. 6 includes a system bus 0601, a central processing unit (CPU) 0602, a memory (Memory) 0603, a storage device (Storage Device) 0604, and a video interface (Video Interface) 0605. Further, the information processing apparatus includes an input/output (hereinafter, referred to as "I/O") interface (I/O interface) 0606, and a communication interface (Communication Interface) 0607, as constituent elements. The above-described constituent elements are connected via the system bus 0601.

The CPU 0602 can execute a program stored in the memory 0603 to control various constituent elements via the system bus 0601 and perform data calculations and conversions that are required in the print saving processing. For example, the data stored in the memory and usable in the print saving processing includes document data, page information, blank area size information, coordinate information of each rendering object, coordinate information of a formed group, and coordinate information of a divided division group.

The memory 0603 is a device that stores a program relating to the above-described print saving processing performed by the CPU 0602. The memory 0603 can be, for example, constituted by a random access memory (RAM) or a read only memory (ROM).

The storage device 0604 performs storing/reading of the above-described data and programs stored in the memory 0603. The storage device 0604 includes a hard disk drive (HDD) 0611, a Floppy® disk drive (FDD) 0612, and a compact disc—ROM (CD-ROM) drive (CD-ROM) 0613 that is usable as a nonvolatile data source. An example electronic document stored in the memory 0603 is described below.

Figure 7:
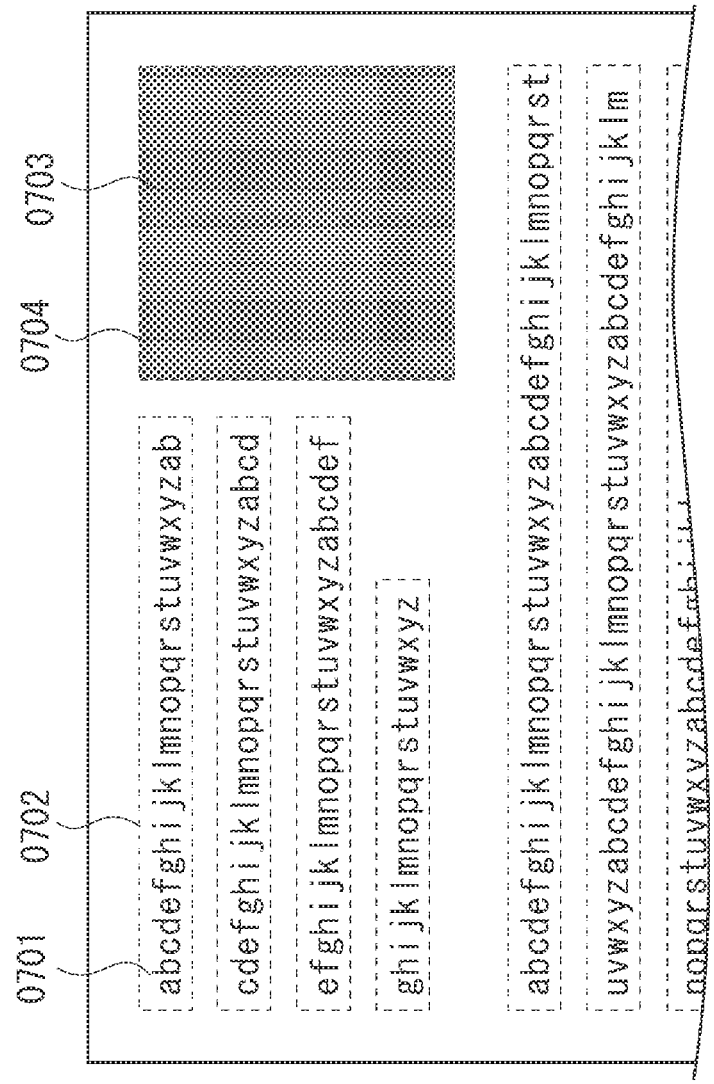
FIG. 7 illustrates an example relationship between an electronic document and rendering objects.

The electronic document illustrated in FIG. 7 includes a text object 0702 as an assembly of texts (character strings) 0701. The texts 0701 are minimum units processable in grouping of rendering objects or in division of a group. The minimum units are variable according to each electronic document format. An example format described in the present exemplary embodiment is Portable Document Format (hereinafter, referred to as "PDF") that defines an assembly of texts as an object constituting a one-line rectangular area.

Another method for defining an object is, for example, expressing a rectangular area based on the height and the width of fonts or encircling characters.

The electronic document illustrated in FIG. 7 further includes an image object 0703 and an outer frame 0704 of the image object 0703. The data defined as an object is allocated attribute information as information representing each object. The attribute information can be referred to when the information processing apparatus performs grouping of objects and division of a group.

FIG. 8 illustrates example attribute information of a rendering object. The attribute information illustrated in FIG. 8 includes a coordinate axis 0810 provided on a page of an electronic document and a rendering object 0811 disposed along the coordinate axis 0810. The attribute information illustrated in FIG. 8 further includes attribute information 0820 of the rendering object 0811.

A document page includes the coordinate axis 0810 having an origin positioned at the upper left corner thereof. The rendering object 0811 on the document page has a rectangular shape whose position can be defined by coordinates of an upper-left corner 0823 and coordinates of a lower-right corner 0824. The attribute information 0820 includes an identification (ID) 0821 that is allocated to the rendering object 0811.

The ID 0821 of the rendering object 0811 is unique identification information usable to identify the rendering object 0811 existing in the electronic document. Further, the attribute information 0820 includes a type 0822 of the rendering object 0811. The type 0822 is, for example, image, text (character string), line, curve, or shape (e.g., rectangle or circle).

Further, the attribute information 0820 includes unique information 0825 of the rendering object 0811. The unique information 0825 of the rendering object 0811 is, for example, font or text color or font size in a case where the type 0822 is text (character string).

In the present exemplary embodiment, the information processing apparatus uses the ID 0821, the type 0822, the coordinates of the upper-left corner 0823, and the coordinates of the lower-right corner 0824, of the attribute information 0820 illustrated in FIG. 8, to perform grouping and group division processing. A program relating to the print saving processing can be read from the storage device 0604 (see FIG. 6) and stored in the memory 0603 (see FIG. 6) so that the CPU 0602 (see FIG. 6) can execute the program.

Referring back to FIG. 6, the video interface 0605 can control video data to be output and displayed on a display device (Video Display) 0616. In the present invention, the video interface 0605 controls the display of document data to be displayed before starting the print saving processing as well as document data to be displayed after completing the print saving processing.

The I/O interface 0606 is connected to input devices, such as a keyboard (Keyboard) 0614 and a pointing device 0615. An operator can operate the keyboard 0614 to input operational commands to the information processing apparatus illustrated in FIG. 6. Further, the operator can manipulate the pointing device 0615 to move a cursor on a screen of the display device 0616 to perform selection and designation on menu items and rendering objects.

The communication interface 0607 can perform communications with an external device via a local area network (LAN) 0618. The connection destination is not limited to the LAN and can be a wide area network (WAN), Internet, or a public telephone line. Further, the communication interface 0607 can communicate with an output device, such as a local printer (Printer) 0617.

Next, an example processing according to an exemplary embodiment that can be performed by the information processing apparatus illustrated in FIG. 6 is described below with reference to flowcharts illustrated in FIGS. 9 and 10. To realize the processing in each step of the flowcharts illustrated in FIGS. 9 and 10, the CPU 0602 reads a related program from the memory and executes the read program.

In step S0901, the CPU 0602 receives a print request (or a print preview request) with respect to an electronic document. The print request can be instructed by a user via the keyboard 0614 or the mouse 0615 or may be instructed by a system program.

After receiving the print request, in step S0902, the CPU 0602 (see FIG. 6) performs print saving processing. The print saving processing (step S0902) is described in more detail with reference to a flowchart illustrated in FIG. 10.

After completing the print saving processing, in step S0903, the CPU 0602 (see FIG. 6) controls the printer 0617 (see FIG. 6) to perform printing or controls the video display 0616 to perform print preview display. Although the above-described sequential print saving processing is automatically performed, a user can manually perform the processing while confirming each step of the print saving processing.

In addition to the above-described steps S0901 to S0903, the CPU 0602 can perform processing for determining whether the number of papers can be reduced (see step S0904), as described below, according to an exemplary embodiment of the present invention. The CPU 0602 executes the processing in step S0904 as an example of third determination processing.

Figure 9:
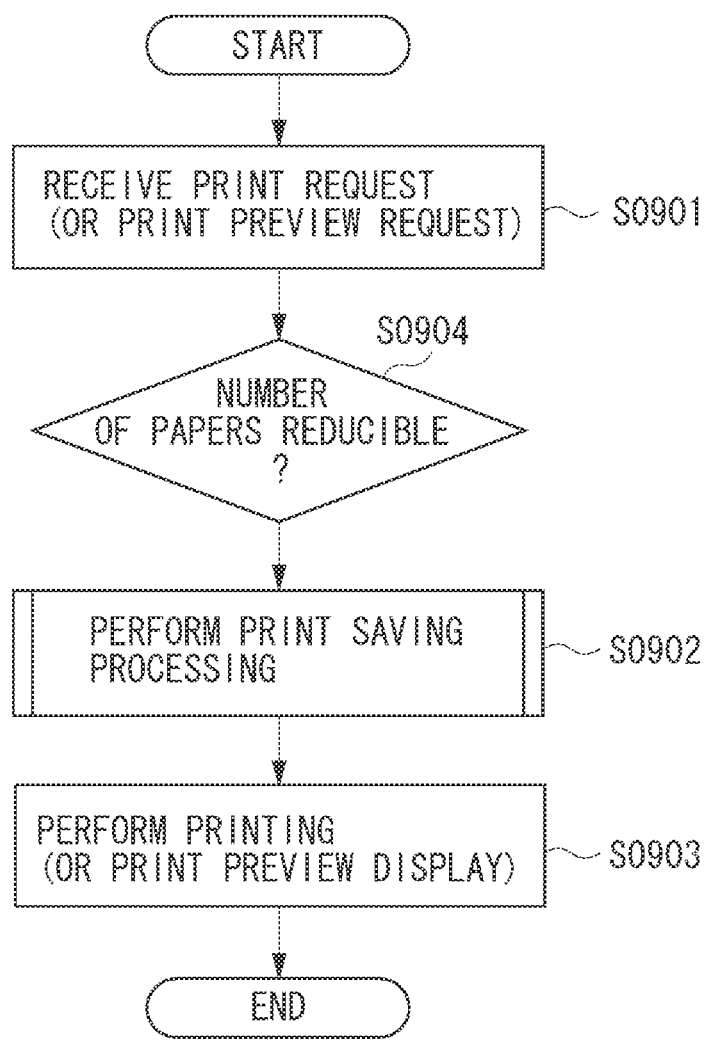
FIG. 9 is a flowchart illustrating print saving according to an exemplary embodiment of the present invention.
Figure 10:
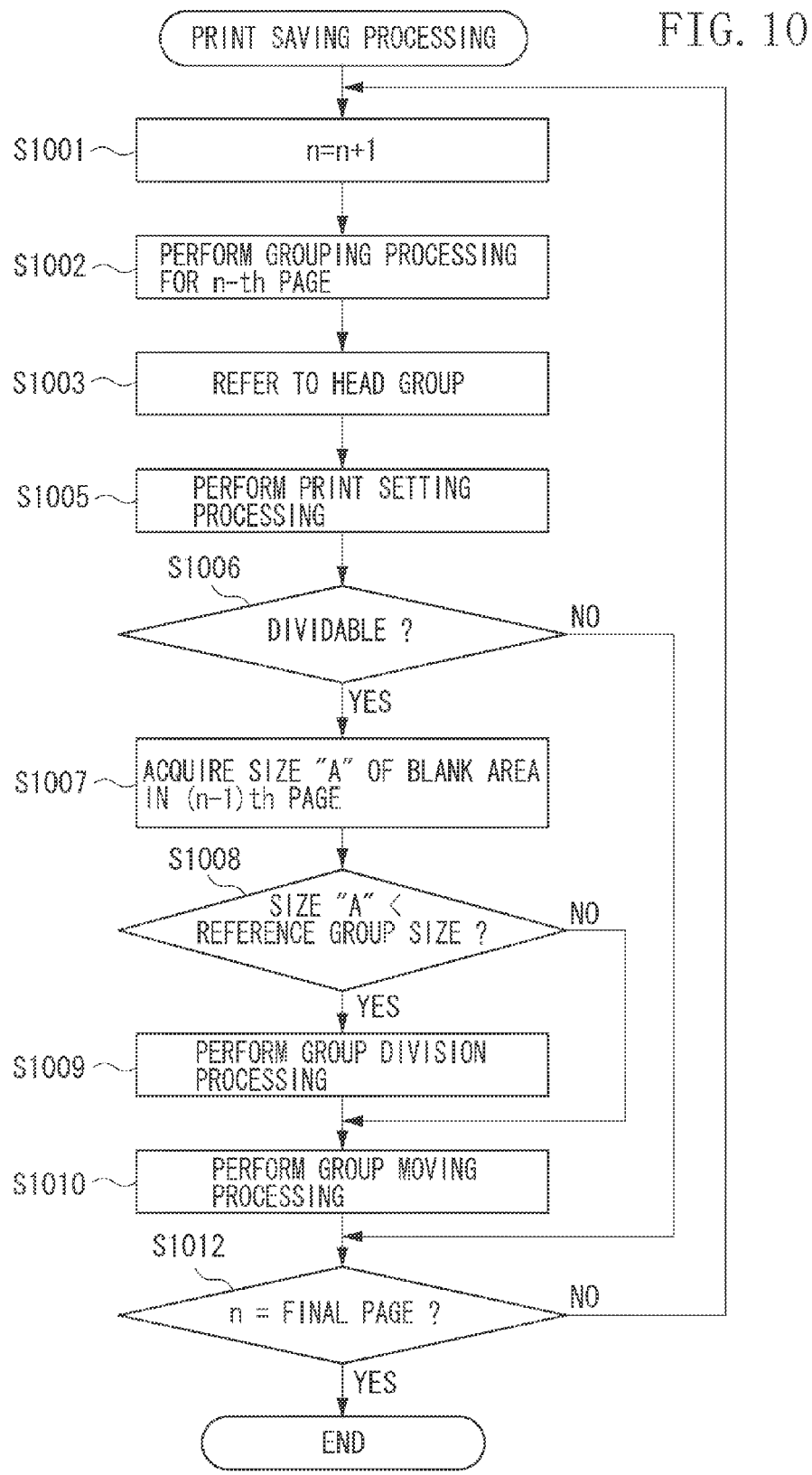
FIG. 10 is a flowchart illustrating print saving processing based on print setting according to a first example embodiment of the present invention.

FIG. 10 is a flowchart illustrating details of the print saving processing that the CPU 0602 performs in step S0903 illustrated in FIG. 9.

In step S1001, the CPU 0602 refers to a page counter n stored in the memory 0603 and increments the page counter n by 1 (i.e., n=n+1). The CPU 0602 refers to the n-th page of the electronic document stored in the memory 0603, based on the value of the page counter n. In the present exemplary embodiment, an initial value of n is 0.

In step S1002, the CPU 0602 performs the grouping processing illustrated in FIGS. 2, 3, and 5 on rendering objects included in the n-th page. In step S1003, the CPU 0602 refers to the head group of the n-th page. In this case, coordinate values defining each group can be used to identify the head group.

Subsequently, in step S1005, the CPU 0602 acquires print setting information. For example, in a case where the print setting information is manually set by a user, the CPU 0602 acquires the print setting information via an Application Program Interface (API) of a system of the program stored in the memory. Further, in a case where the print setting information is defined beforehand by a Job Definition Format (JDF), the CPU 0602 acquires the print setting information by reading a JDF file included in bibliography information of the electronic document stored in the memory 0603 (see FIG. 6).

Figure 11:
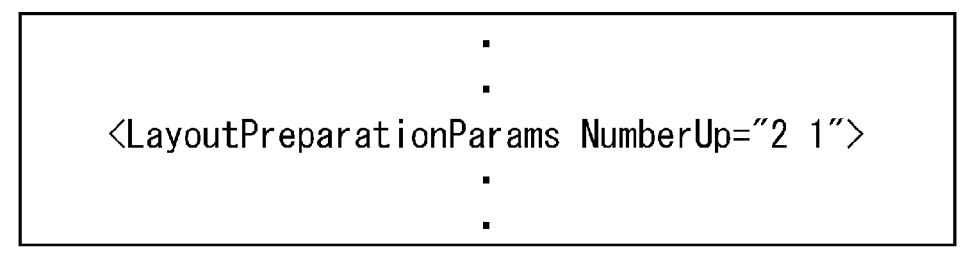

FIG. 11 illustrates an example of a print designation described in a JDF file. The attribute of "LayoutPreperation-Params NumberUp" parameter is setting relating to the N-in-1 printing. The value "2 1" indicates 2-in-1 printing. The method for expressing JDF file parameters and values is variable depending on each system.

In step S1006, the CPU 0602 determines whether the acquired print setting information indicates that the group division is feasible. More specifically, according to the N-in-1 print setting, divided groups may be disposed on the same surface even after group division and allocation is completed. Therefore, the CPU 0602 determines that the group division is feasible if the print setting is the N-in-1 printing.

If it is determined that the group division is unfeasible (NO in step S1006), then in step S1012, the CPU 0602 performs page moving processing.

If it is determined that the group division is feasible (YES in step S1006), then in step S1007, the CPU 0602 acquires the size "A" of a blank area of the (n-1)th page.

In step S1008, the CPU 0602 compares the size "A" of the blank area of the (n-1)th page acquired in step S1007 with the size of the head group of the n-th page (i.e., a moving target). If it is determined that the size of the head group of the n-th page is greater than the blank area acquired in step S1007 (YES in step S1008), then in step S1009, the CPU 0602 divides the head group because the head group cannot be entirely disposed in the blank area of the (n-1)th page.

Then, in step S1010, the CPU 0602 moves the first group generated by the division processing to the blank area of the (n-1) th page. The division processing according to the present exemplary embodiment has been already described with reference to FIG. 5.

On the other hand, if it is determined that the size of the head group of the n-th page is equal to or smaller than the blank area of the (n-1) th page (NO in step S1008), then in step S1010, the CPU 0602 directly moves the head group of the n-th page to the blank area of the (n-1)th page.

As described below in another exemplary embodiment, the determination result with respect to the above-described group division is dependent on data contents. Therefore, even in step S1008 if it is determined that the size of the blank area is smaller than the group size of the moving target, the CPU 0602 may not perform the group division if the print setting is not suitable for the group division.

In step S1012, the CPU 0602 determines whether the n-th page is the final page of the electronic document to be subjected to the print saving processing with reference to the counter n information and the electronic document information stored in the memory.

If it is determined that the n-th page is not the final page (NO in step S1012), the CPU 0602 repeats the above-described processing in steps S1001 through S1012. If it is determined that the n-th page is the final page (YES in step S1012), the CPU 0602 completes the print saving processing (i.e., terminates the processing of the flowchart illustrated in FIG. 10).

As described above, the information processing apparatus according to the present exemplary can reduce the total number of papers output in printing by performing the above-described print saving processing.

Next, a second exemplary embodiment is described below with reference to FIG. 12. In the second exemplary embodiment, the N-in-1 printing for allocating a plurality of pages on the same surface of a paper is set and also the two-sided printing for allocating pages on the front and back surfaces of a paper is set with respect to the print saving processing based on print setting.

Figure 12:
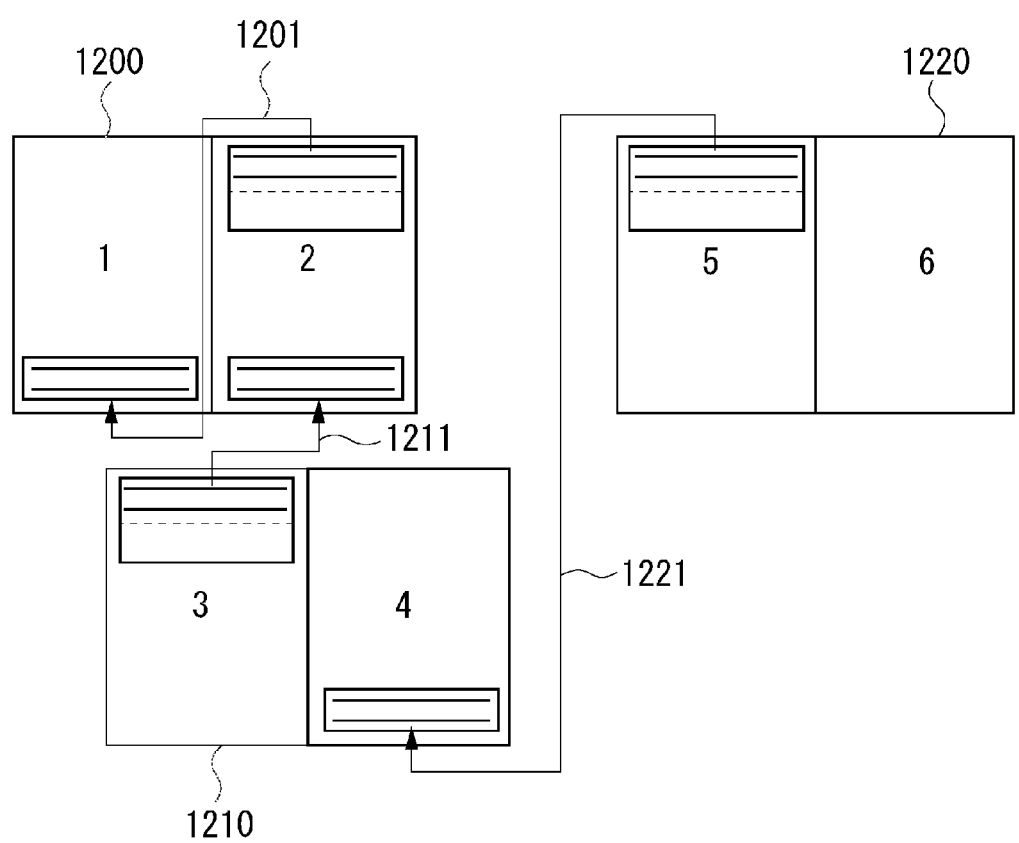
FIG. 12 illustrates a page transition pattern in a case where 2-in-1 printing and two-sided printing are set, which is described in a second example embodiment of the present invention.

FIG. 12 illustrates an example page transition pattern in a case where the 2-in-1 printing and the two-sided printing are set.

The page transition pattern illustrated in FIG. 12 includes a front surface 1200 of the first paper, a back surface 1210 of the first paper, and a front surface 1220 of the second paper. The number (1-6) added on each paper represents a page number.

More specifically, page 1 and page 2 are allocated on the front surface 1200 of the first paper, page 3 and page 4 are allocated on the back surface 1210 of the first paper, and page 5 and page 6 are allocated on the front surface 1220 of the second paper.

There are three patterns with respect to the print saving processing applicable to the document illustrated in FIG. 12.

According to a first pattern 1201, if the group division is performed on the head group of the page 2, divided groups can be disposed on the same front surface 1200 of the first paper. In a case where the divided groups are disposed on the same surface, the ease of reading a resulting document is not deteriorated even after the group division processing is accomplished. Therefore, the information processing apparatus performs the group division processing for the first pattern 1201.

According to a second pattern 1211, divided groups are separately disposed on the front surface 1200 of the first paper and the back surface 1210 of the first paper. In other words, the divided groups are disposed on different surfaces. In this case, the ease of reading a resulting document may be deteriorated. Therefore, the information processing apparatus does not perform the group division processing for the second pattern 1211.

According to a third pattern 1221, divided groups are separately disposed on the back surface 1210 of the first paper and the front surface 1220 of the second paper. In other words, the divided groups are disposed on different papers. In this case, the ease of reading a resulting document may be deteriorated. Therefore, the information processing apparatus does not perform the group division processing for the third pattern 1221.

As described above, the information processing apparatus according to the present exemplary embodiment divides a moving target group if the first group and the second group obtainable by the division processing can be allocated on the same surface of a paper. On the other hand, the information processing apparatus according to the present exemplary embodiment does not divide the moving target group if the first group and the second group are separately allocated on different surfaces or on different papers.

Through the above-described procedure, the information processing apparatus according to the present exemplary embodiment can change the layout while maintaining the ease of reading a resulting document and increasing the print efficiency of papers.

Figure 13:
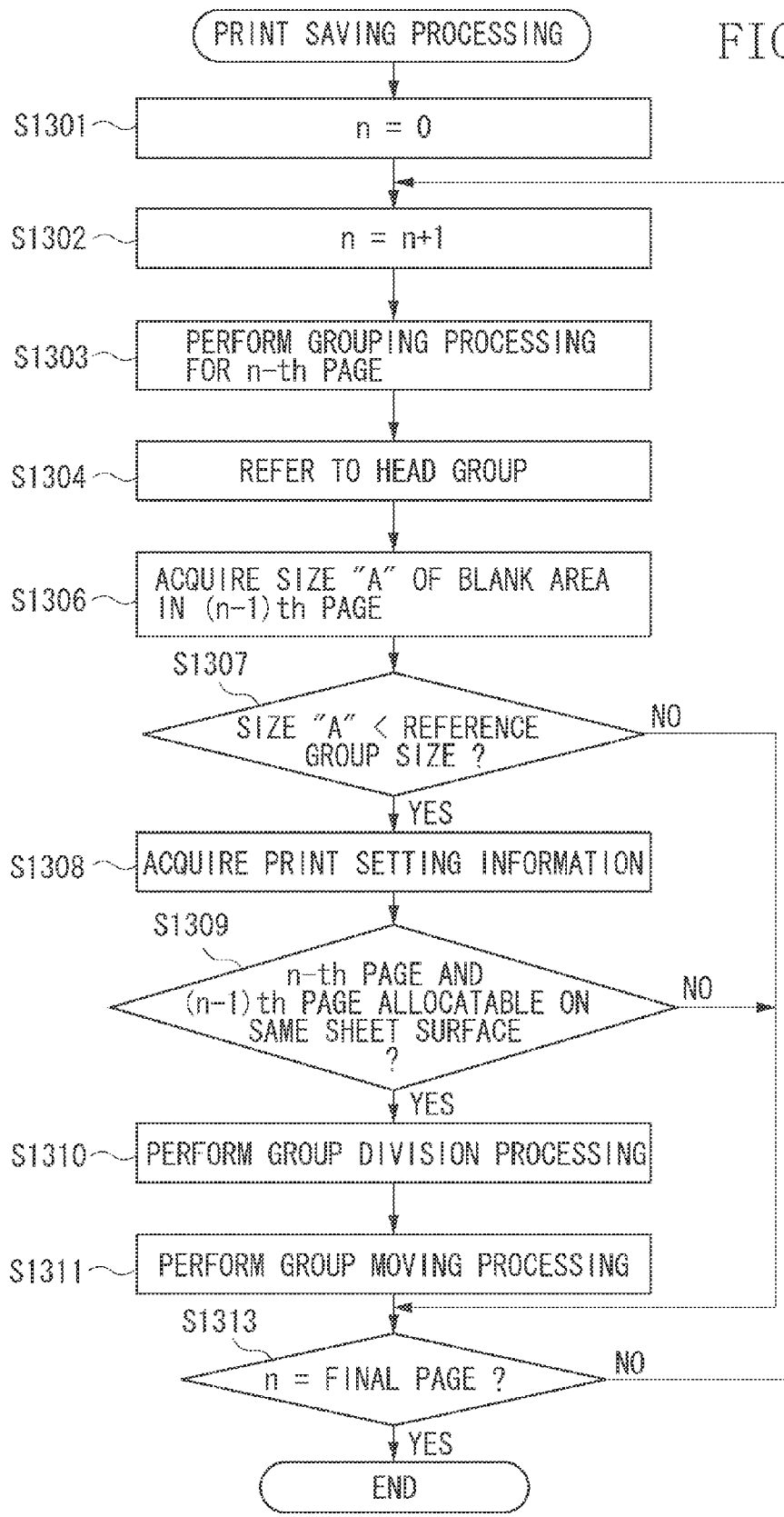
FIG. 13 is a flowchart illustrating print saving processing according to the second example embodiment of the present invention, which can be performed in a case where the 2-in-1 printing and the two-sided printing are set.

An example operation according to the second exemplary embodiment is described below with reference to a flowchart illustrated in FIG. 13.

In step S1301, the CPU 0602 initializes the page counter n stored in the memory (i.e., n=0).

Processing to be performed in steps S1302 to S1304 is similar to the processing performed in steps S1001 to S1003 illustrated in FIG. 10. Processing to be performed in steps S1306 and S1307 is similar to the processing performed insteps S1007 and S1008. Therefore, descriptions of these steps are not repeated.

In the comparison of step S1307, if the size of the head group of the n-th page is greater than the blank size of the (n-1)th page, the head group of the n-th page cannot be disposed in the blank area. Therefore, in step S1308, the CPU 0602 acquires print setting information to determine in step S1309 whether the print setting is suitable for the division processing. The processing in step S1307 is an example of first determination processing.

In step S1309, the CPU 0602 determines whether the n-th page and the (n-1)th page on which the divided groups are to be disposed can be allocated on the same surface of a paper based on the print setting information acquired in step S1308. As an example of the determination method, the CPU 0602 performs determination using a virtual layout result of each group according to the print setting information.

As another method, if the n-th page is an odd-number page and the (n-1)th page is an even-number page in a case where the print setting is the 2-in-1 printing, the CPU 0602 determines that the divided groups can be allocated on the same surface. The processing in step S1309 is an example of second determination processing.

If it is determined that the n-th page and the (n-1)th page on which the divided groups are to be disposed cannot be allocated on the same surface of a paper (NO in step S1309), the CPU 0602 does not perform the division processing because the ease of reading a resulting document may be deteriorated. The processing of the CPU 0602 directly proceeds to step S1313.

On the other hand, if it is determined that the n-th page and the (n-1)th page on which the divided groups are to be disposed can be allocated on the same surface of a paper (YES in step S1309), the CPU 0602 executes processing insteps S1310 and S1311. The processing to be executed in steps S1310 and S1311 is similar to the processing performed insteps S1009 and S1010. Therefore, the descriptions for these steps are not repeated.

In step S1313, the CPU 0602 determines whether the n-th page is the final page of the document. If the n-th page is not the final page of the document (NO in step S1313), the processing of the CPU 0602 returns to step S1302 and repeats the above-described processing of steps S1302 through S1313. If the n-th page is the final page of the document (YES in step S1313), the CPU 0602 terminates the sequential print saving processing of the flowchart illustrated in FIG. 13.

Through the above-described procedure, the information processing apparatus according to the present exemplary embodiment can perform print saving processing while reducing the number of papers and maintaining the ease of reading an output document.

Next, example print saving processing capable of reducing the number of papers according to an exemplary embodiment is described below.

Figure 14:
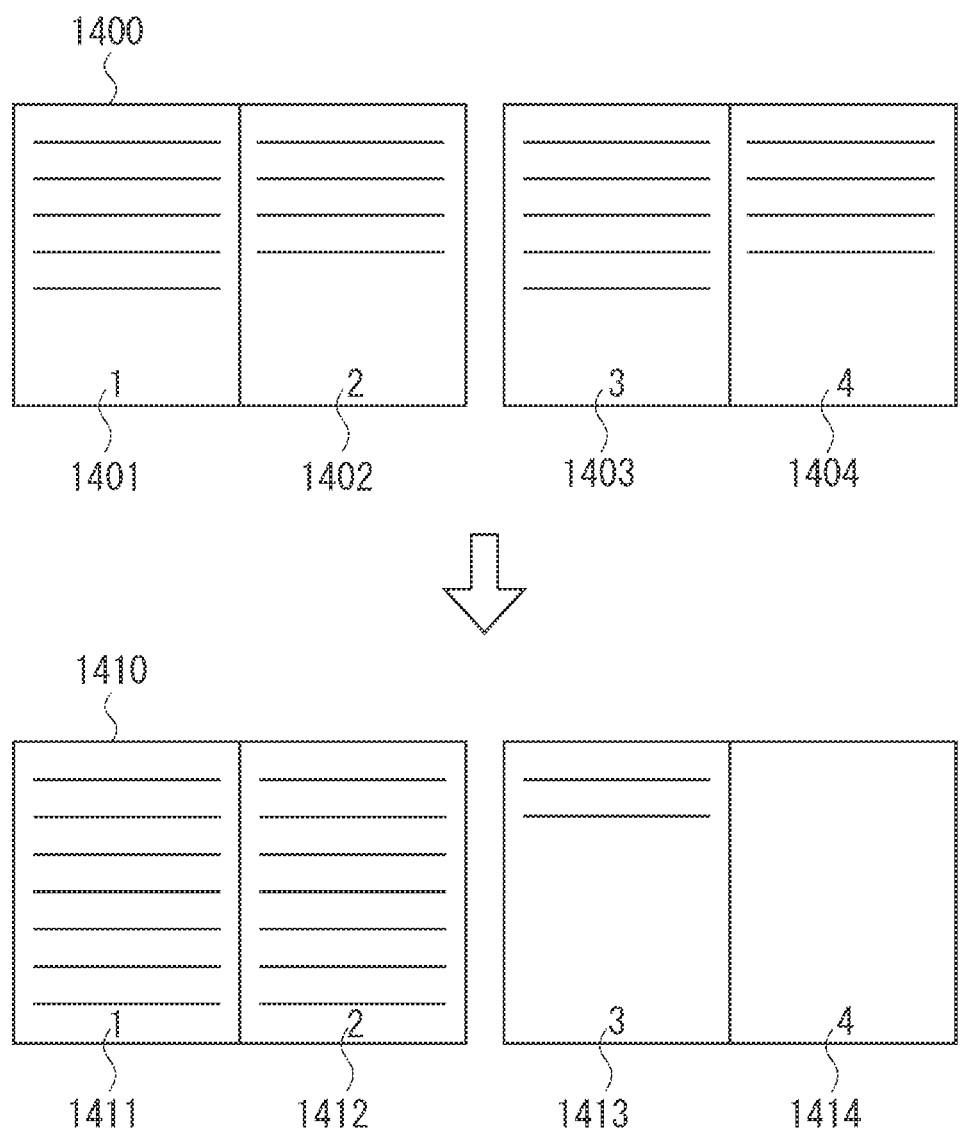
FIG. 14 illustrates print saving processing and reduction of papers, which is described in the second exemplary embodiment of the present invention.

FIG. 14 illustrates a print result 1400 obtainable when the 2-in-1 printing of an electronic document is performed without performing the print saving processing. Further, FIG. 14 illustrates a print result 1410 obtainable when the print saving processing is performed so as to move the head group to a preceding blank area regardless of print setting.

The electronic document illustrated in FIG. 14 includes four pages 1401 to 1404. According to the print result 1410 obtained by performing the print saving processing, the number of pages including any rendering object reduces from four pages to three pages. However, the number of papers does not reduce because the print setting is the 2-in-1 printing.

As described above, the main purpose of performing the print saving processing is reduction in the number of papers. However, no paper reduction effect can be obtained if the print setting is inappropriate.

Hence, as indicated in the flowchart illustrated in FIG. 9, the present exemplary embodiment provides the determination step S0904 for determining whether the number of papers can be reduced. The CPU 0602 virtually performs print saving processing and determines whether the number of papers is reducible. If the number of papers is reducible, the CPU 0602 actually performs the print saving processing.

The above-described processing is effective in that the information processing apparatus can prevent the print saving processing from being unnecessarily performed and prevent the document layout from being changed in a case where the effect of reducing the number of papers cannot be obtained.

In the above-described print saving processing performed in the first and second exemplary embodiments, the division target is a group constituted by a text object. In a third exemplary embodiment, the division target of the print saving processing is a rendering object other than a text object.

Figure 15:
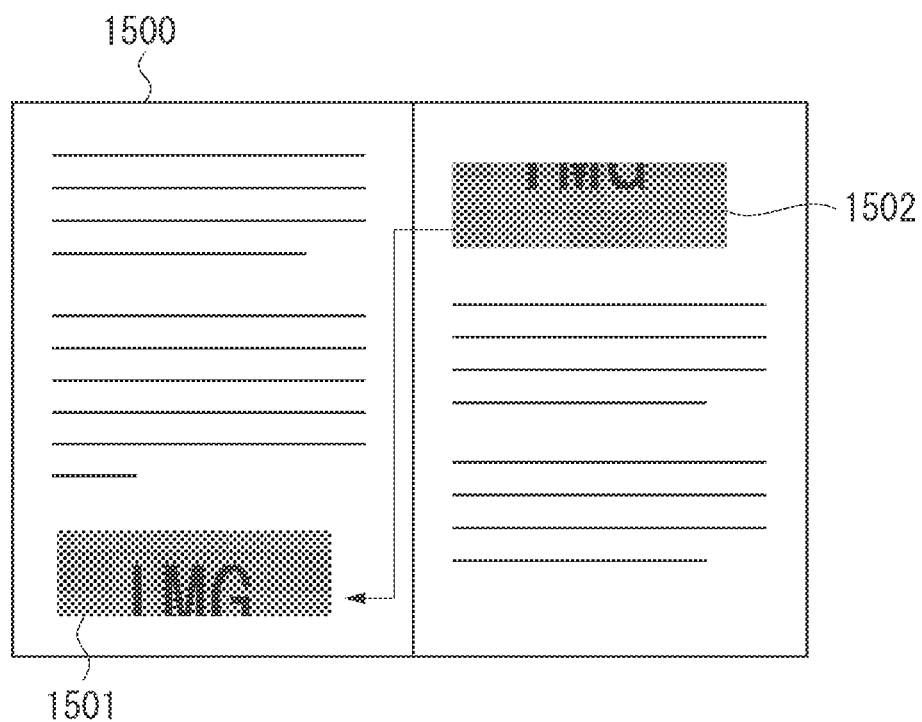
FIG. 15 illustrates an example division of an image in print saving processing, which is described in a third exemplary embodiment of the present invention.

FIG. 15 illustrates an example of divided image objects. A surface 1500 of a paper, which is output as a result of the 2-in-1 printing and the print saving processing, includes a first group 1501 and a second group 1502 that are obtained as a result of division processing performed on an image object.

In this case, the image object is identified as one group through the grouping processing and the identified group is divided into two parts through the division processing. A division group positioned on the leading side is moved to the preceding page.

In the division processing to be performed on an image object, similar to the division of a text object, the information processing apparatus reads coordinate information of the image from the memory or the storage device and divides the image object at an appropriate position so that a divided part of the image has a size equal to or smaller than a blank area of the preceding page.

Figure 16:
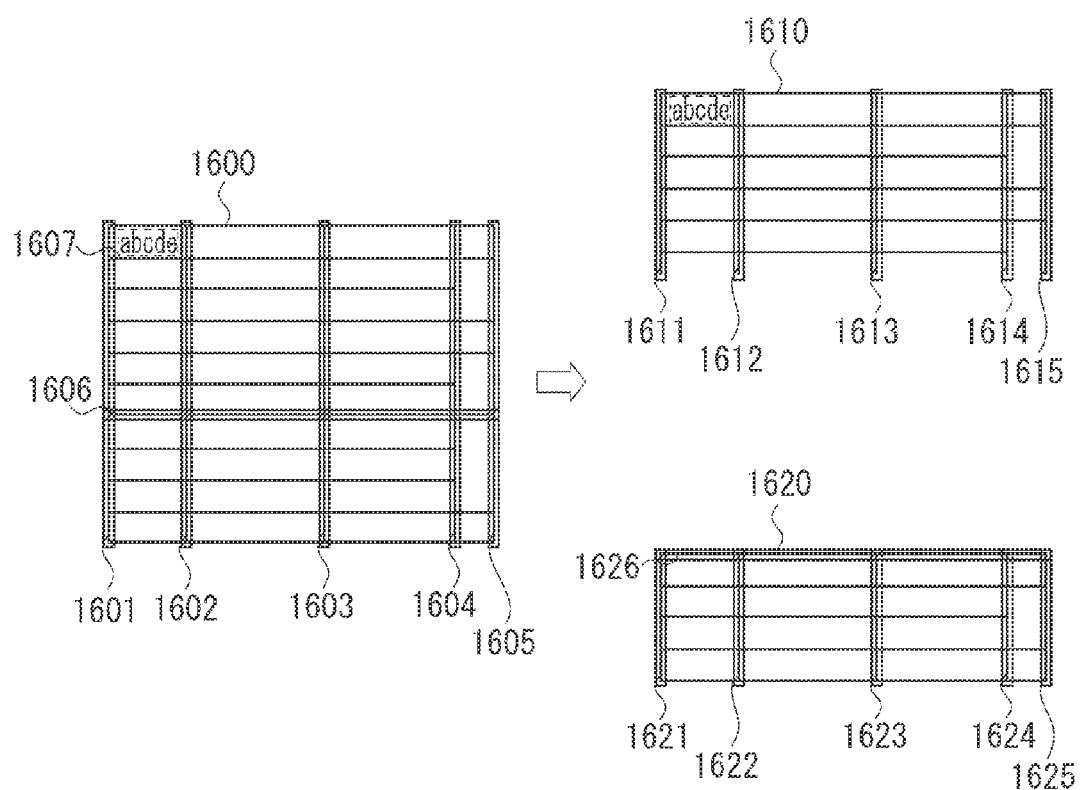
FIG. 16 illustrates an example division of a table, which is described in a fourth exemplary embodiment of the present invention.

Next, a fourth exemplary embodiment is described, in which a rendering object serving as a target of the division processing is a table. FIG. 16 illustrates an example division of a table. In general, a table is a combination of ruled lines (i.e., vertical and horizontal line objects). According to the example illustrated in FIG. 16, one table 1600 is divided into two tables 1610 and 1620.

The table 1600 includes five vertical line objects 1601 to 1605, a horizontal line object 1606, and a text object 1607 disposed in a cell. The vertical line objects 1601 to 1605 of the table 1600, when divided, become vertical lines 1611 to 1615 and vertical lines 1621 to 1625 of the tables 1610 and 1620. The horizontal line 1606 of the table 1600 becomes a line object 1626 of the table 1620.

The division of a table according to the present exemplary embodiment is performed in such a manner that a cell or a text object is not divided. Namely, to determine a dividable position in the division processing, the processing according to the present exemplary embodiment includes referring to attribute information of a table, reading coordinate information included in the attribute information of a horizontal line object, and selecting an optimum divisional position.

According to the example illustrated in FIG. 16, the table 1600 is divided at an upper side of the horizontal line object 1606. In this case, the processing according to the present exemplary embodiment includes calculating a length considering a blank area size and dividing the vertical line object 1601 into two line objects 1611 and 1621 based on a calculation result.

Similarly, the processing according to the present exemplary embodiment includes dividing vertical line objects 1602 to 1605 into two line objects, respectively. The processing according to the present exemplary embodiment further includes moving the divided table 1610 to another page together with the text object 1607 positioned at a corresponding position of the table.

In the division of a table, similar to the division of a text object or an image object, the information processing apparatus according to the present exemplary embodiment reads coordinate information from a memory and performs division processing based on the obtained coordinate information.

Next, group division processing according to a fifth exemplary embodiment is described below with reference to FIG. 17 in which there is a plurality of dividable positions.

Figure 17:
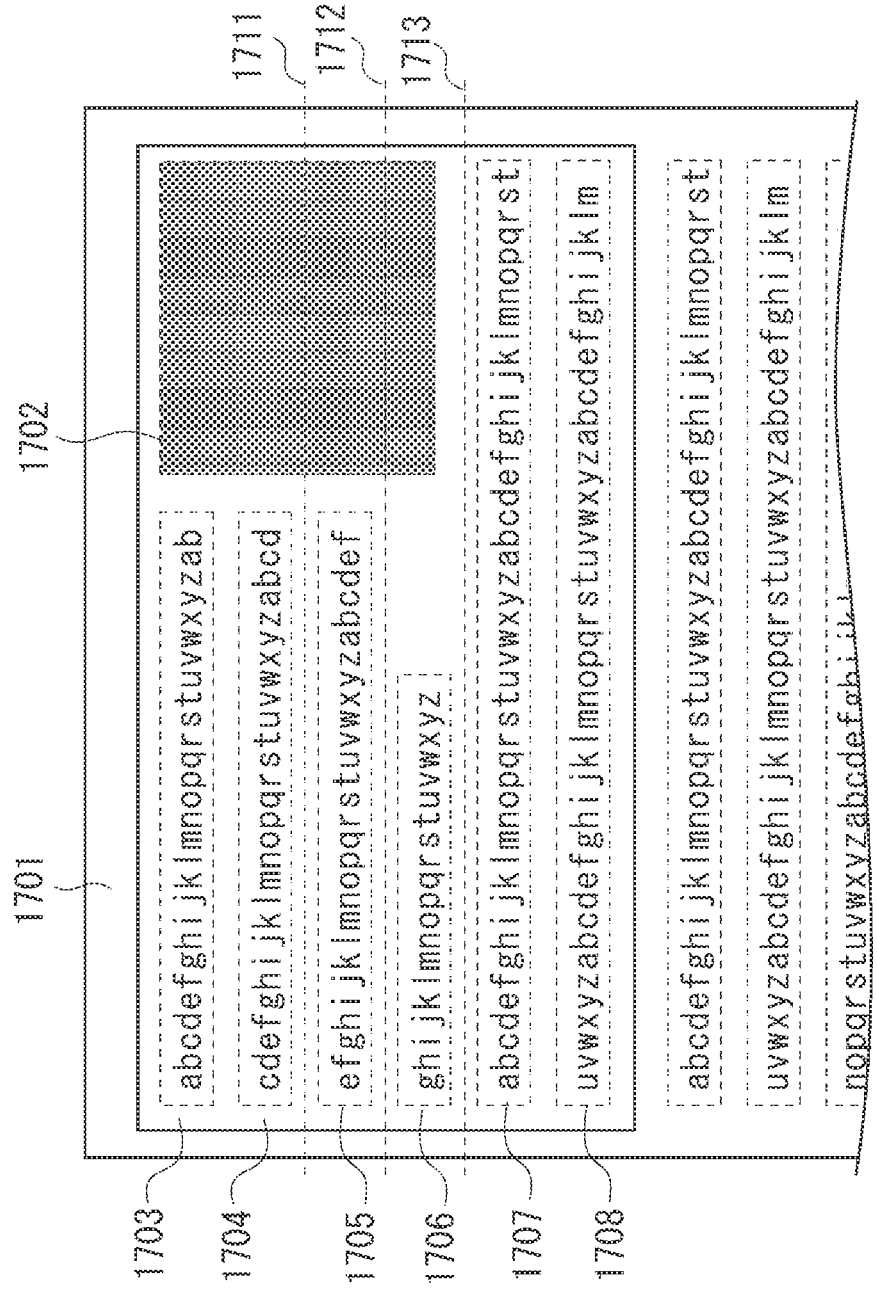
FIG. 17 illustrates an example division of a group including an image and a text, which is described in a fifth exemplary embodiment of the present invention.

A group 1701 illustrated in FIG. 17 is a division target. The group 1701 includes an image object 1702 and a plurality of text objects 1703 to 1708. According to the example illustrated in FIG. 17, the group division processing is feasible at positions indicated by horizontal dotted lines 1711 to 1713.

In a case where an image object and a text object are present in the same group, the processing according to the present exemplary embodiment includes calculating positions (i.e., dotted line 1711, dotted line 1712, and dotted line 1713) where the group 1701 is dividable using the method described with reference to FIG. 5 and selecting an optimum position where the group 1701 is actually divided.

According to the example illustrated in FIG. 17, if the selected divisional position is the dotted line 1711 or the dotted line 1712, the image object 1702 is divided undesirably. Therefore, the information processing apparatus according to the present exemplary embodiment selects the dotted line 1713 as the optimum position where no image object is divided and executes the division processing along the selected dotted line 1713.

As another exemplary embodiment relating to setting of the divisional position, it is useful to provide a division setting unit configured to enable users to determine whether to perform the division processing for each rendering object or each formed group. Further, it is useful to provide a reduction setting unit configured to enable users to determine whether to reduce each rendering object or each formed group.

Referring back to the example illustrated in FIG. 17, if an attribute having being set for the image object 1702 indicates accepting any division of the image object 1702, the information processing apparatus can divide the group along the dotted line 1711. On the other hand, if the attribute inhibits any division of the image object 1702, the information processing apparatus does not perform the division processing.

For example, in a case where the division setting unit does not allow any division of the image object 1702, the information processing apparatus divides the group along the dotted line 1713 where the image object 1702 is not divided.

As described above, the present exemplary embodiment enables users to set division setting and reduction setting for each rendering object and each group. Therefore, the information processing apparatus can execute processing so as to reflect user's intent and, as a result, can realize print saving processing giving users a higher degree of freedom.

Figure 18:
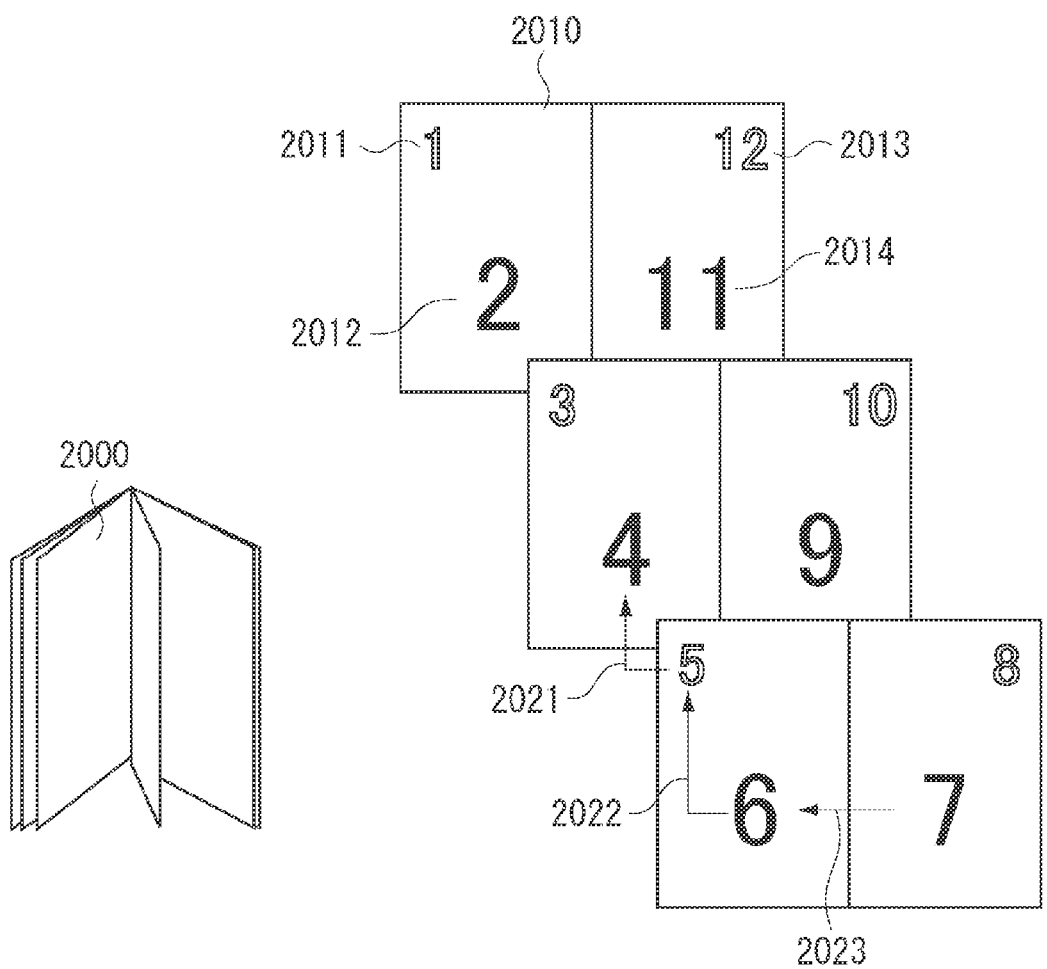
FIG. 18 illustrates an example page transition pattern in bookbinding printing, which is described in a sixth exemplary embodiment of the present invention.

Next, print saving processing based on print setting according to a sixth exemplary embodiment is described below with reference to FIG. 18. FIG. 18 illustrates an example page transition pattern in bookbinding printing.

The bookbinding printing includes stacking and binding a plurality of papers. Although there are various types of binding methods, the example illustrated in FIG. 18 is saddle stitch binding.

FIG. 18 illustrates a printed product of a document including twelve pages, which is obtainable by performing the saddle stitch binding.

Four pages allocated on surfaces of the first paper 2010 are page 1 (indicated by a reference numeral 2011), page 2 (indicated by a reference numeral 2012), page 11 (indicated by a reference numeral 2014), and page 12 (indicated by a reference numeral 2013). More specifically, the page 2 (2012) is disposed on the left side of the front surface of the first paper and the page 1 (2011) is disposed on the back surface of the first paper so as to be on a reverse side of the page 2 (2012).

Similarly, the page 11 (2014) is disposed on the right side of the front surface of the first paper and the page 12 (2013) is disposed on the back surface of the first paper so as to be on a reverse side of the page 11 (2014). Similarly, other page numbers are allocated to the front and back surfaces of the second and third papers.

In FIG. 18, arrows 2021, 2022, and 2023 indicate example patterns of the print saving processing that can be performed in the bookbinding printing. The patterns 2021 and 2023 are relocation patterns shifting from the right page to the left page in an opened (spread) state of a book. The pattern 2022 is a relocation pattern shifting from the front surface to the back surface of a paper.

In the present exemplary embodiment, the page 4 and the page 5 are a pair of pages disposed at left and right sides in an opened (or spread) state of the book. Similarly, the page 6 and the page 7 are another pair of pages disposed at left and right sides in an opened (or spread) state of the book. Further, the page 5 and the page 6 are a pair of pages disposed on the front and back surfaces of a paper.

First, the print saving processing indicated by the arrow 2023 is described below. The third paper on which pages 5 to 8 are allocated is a paper located at a highest position in a saddle stitched state.

If the head group of the page 7 is divided, divided groups are disposed on the page 6 and the page 7. In this case, the page 6 and the page 7 are allocated to the left and right sides in an opened (or spread) state. In other words, even after the group division is finished, the ease of reading an output document is not deteriorated. Therefore, the information processing apparatus according to the present exemplary embodiment performs the group division processing.

Next, the print saving processing indicated by the arrow 2021 is described below. If the head group of the page 5 is divided, divided groups are disposed on the page 4 and the page 5. The page 4 and the page 5 are positioned at the left and right sides in an opened (or spread) state of the book being saddle stitched, although the page 4 and the page 5 are allocated on different papers. Therefore, the information processing apparatus according to the present exemplary embodiment performs the group division processing.

If the print saving processing is performed according to the pattern indicated by the arrow 2022, divided groups are disposed on the page 5 and the page 6. The page 5 and the page 6 of the book being saddle stitched are allocated on the front and back surfaces of the third paper. Namely, the page 5 and the page 6 are not positioned at the left and right sides in an opened (or spread) state of the book. Therefore, the ease of reading an output document may be deteriorated. Therefore, the information processing apparatus according to the present exemplary embodiment does not perform the group division processing.

In FIG. 18, the page 2011 serving as the head page and the page 2013 serving as the final page are disposed at an external side of the book. Therefore, the pages 2011 and 2013 may be regarded as cover pages that are not a target of the above-described processing.

Further, the page 2012 and the page 2014 serve as back surfaces of the cover pages. Therefore, the pages 2012 and 2013 may not be regarded as a target of the above-described processing. As described above, it is useful to exclude unsuitable pages from the print saving processing.

As another exemplary embodiment, in the case binding according to which a single paper is used to constitute the cover pages, it is useful to perform the print saving processing for the page serving as the front cover.

Through the above-described procedure, the information processing apparatus according to the present exemplary embodiment can change the layout while maintaining the ease of reading an output document and reducing the number of papers.

As another exemplary embodiment, a seventh exemplary embodiment is described below. A reduction setting unit is provided to enable users to set a reduction attribute indicating whether a division target group is reducible. If the reduction setting indicates that the division target group is reducible, the information processing apparatus according to the present exemplary embodiment reduces the size of the division target group and moves the reduced target group to another page.

Figure 19:
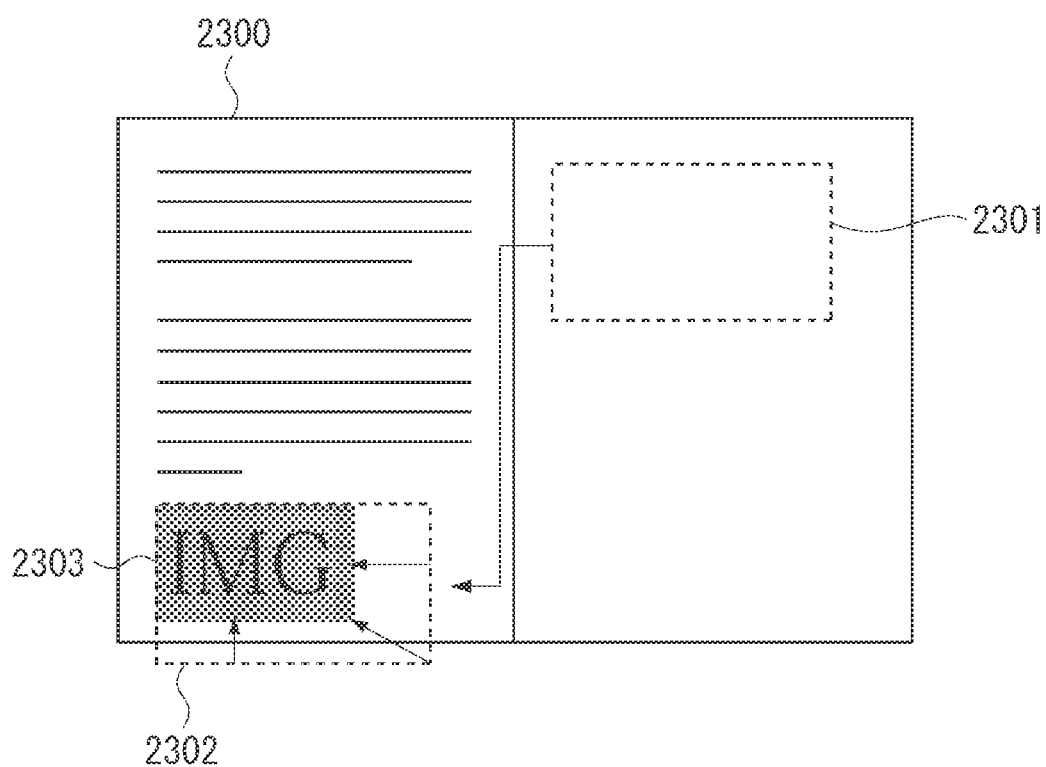
FIG. 19 illustrates print saving processing combined with reduction processing, which is described in a seventh exemplary embodiment of the present invention.

FIG. 19 illustrates an example print saving that can be realized by reducing an image object 2301 that is recognizable as a group. A paper surface 2300 is an output surface resulting from the 2-in-1 printing. If the print saving processing is performed on the image object while maintaining its original shape (see an area indicated by a dotted line 2301) without any reduction in size, the image object 2301 is moved to a portion indicated by a dotted line 2302.

If the reduction attribute indicates that the image object 2301 is not reducible, the above-described movement of the image object 2301 is unfeasible because the image object 2301 cannot be entirely accommodated in the blank area. On the other hand, if the reduction attribute indicates that the image object 2301 is reducible, the information processing apparatus according to the present exemplary embodiment can reduce the size of the image object 2301 and perform the print saving processing so that the reduced image object 2301 can be thoroughly accommodated in the blank area of the preceding page.

The layout position of each reduced object can be selected, for example, from left, center, and right. According to the example illustrated in FIG. 19, the reduced image is disposed on the left side. The layout position of each reduced object may be determined considering attribute information indicating the layout of the original image or may be newly determined.

It is usual that a limit value is provided in reduction of an image. A practical method for setting a limit value is, for example, a method for setting a reduction rate or a method for setting a minimum image size for individual reduction processing. For example, the reduction setting unit can be configured to determine beforehand the reduction setting for each rendering object or each group or can be configured to determine the reduction setting at appropriate timing during the sequential print saving processing.

As described above, the information processing apparatus according to the present exemplary embodiment can reduce a target group before moving the target group. Therefore, if the target group is an undividable object, the information processing apparatus according to the present exemplary embodiment can skip the division processing in performing the print saving processing. Thus, the present exemplary embodiment can reduce the number of papers while maintaining the ease of reading an output document.

In the above-described exemplary embodiments, the interval between two groups and the margin area of each paper are fixed values determined beforehand. However, the present invention can be implemented even in a case where the interval between two groups and the margin area of each paper are variable.

As an effect of the present invention, the execution frequency of the print saving processing can be increased by determining whether to execute the print saving processing considering print setting.

OTHER EMBODIMENTS

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-224826 filed Sep. 29, 2009, which is hereby incorporated by reference herein in its entirety.

What is claimed is:

1. An information processing apparatus comprising:
   an acquisition unit configured to acquire print setting information;
   a determination unit configured to determine whether, in a case where a head rendering object of a second page of a document cannot be disposed on a first page that precedes the second page, a first group and a second group obtainable by dividing the head rendering object of the second page can be located on a same surface of a same paper based on the print setting information acquired by the acquisition unit; and
   a layout unit configured to execute locating processing for locating the first group on the first page if the determination unit determines that both the first group and the second group can be disposed on the same surface of the same paper,
   wherein the layout unit is configured to start the locating processing if the number of papers to be output in a case where the layout unit executes the locating processing is smaller than the number of papers to be output in a case where the layout unit does not execute the locating processing, and is configured to cancel the locating processing if the number of papers to be output in a case where the layout unit executes the locating processing is not smaller than the number of papers to be output in a case where the layout unit does not execute the locating processing.

2. A method for controlling an information processing apparatus, comprising:
   acquiring print setting information;
   determining whether, in a case where a head rendering object of a second page of a document cannot be disposed on a first page that precedes the second page, a first group and a second group obtainable by dividing the head rendering object of the second page can be located on a same surface of a same paper based on the acquired print setting information;
   executing locating processing for locating the first group to the first page if it is determined that both the first group and the second group can be disposed on the same surface of the same paper;
   starting the locating processing if the number of papers to be output in a case where the locating processing is executed is smaller than the number of papers to be output in a case where the locating processing is not executed, and
   cancelling the locating processing if the number of papers to be output in a case where the locating processing is executed is not smaller than the number of papers to be output in a case where the locating processing is not executed.

3. A non-transitory computer-readable storage medium storing a program that causes a computer to control an information processing apparatus, the program comprising:
   computer-executable instructions for acquiring print setting information;
   computer-executable instructions for determining whether, in a case where a head rendering object of a second page of a document cannot be disposed on a first page that precedes the second page, a first group and a second group obtainable by dividing the head rendering object of the second page can be located on a same surface of a same paper based on the acquired print setting information;
   computer-executable instructions for controlling the information processing apparatus on execute locating processing for locating the first group to the first page if it is determined that both the first group and the second group can be disposed on the same surface of the same paper;
   computer-executable instructions for starting the locating processing if the number of papers to be output in a case where the locating processing is executed is smaller than the number of papers to be output in a case where the locating processing is not executed, and
   cancelling the locating processing if the number of papers to be output in a case where the locating processing is executed is not smaller than the number of papers to be output in a case where the locating processing is not executed.

* * * * *